United States Patent Office 2,982,600
Patented May 2, 1961

2,982,600

URANIUM DECONTAMINATION WITH RESPECT TO ZIRCONIUM

Seymour Vogler and Morris Beederman, Chicago, Ill., assignors to the United States of America as represented by the United States Atomic Energy Commission No Drawing. Filed July 8, 1952, Ser. No. 297,776

21 Claims. (Cl. 23—14.5)

The present invention relates to recovery of uranium and is concerned more particularly with the decontamination of uranium with respect to fission products and especially zirconium.

In the recovery of uranium from a number of sources the decontamination from small amounts of zirconium causes difficulties, and this is especially true when the separation is carried out by solvent extraction of the uranium, because zirconium is also extractable to a high degree. The situation is similar with regard to tetravalent plutonium. Zirconium is associated with uranium in ores, in neutron-irradiated uranium as one of the fission products, and also often in greater quantities in the coatings of the fuel elements for neutronic reactors. In the latter instance, the fuel elements, for example when found flawy, are processed for the recovery of the various components which can then be employed for rebuilding a satisfactory fuel element.

It is a primary objective of the present invention to provide a means whereby the solubility of zirconium in the organic solvent is substantially reduced.

It is a further object of the present invention to provide a process for reduction of zirconium solubility in the organic solvent phase without inhibiting extraction of uranium therein.

It is a further object of the present invention to separate uranium from aqueous solution by solvent extraction without coextracting zirconium.

It is a further object to provide a means for separating zirconium from an organic solvent solution.

It is a further object of this invention to provide a process for decreasing the solubility of tetravalent plutonium in an organic solvent.

It is a further object of this invention to provide a means for removing tetravalent plutonium from an organic solvent solution.

Other objects and advantages of the present invention are set forth hereinafter.

Heretofore, in order to effect adequate decontamination of uranium with respect to plutonium and fission products, various process additives have been employed in appropriate sequence in order to obtain oxidation and/or reduction as necessary to obtain the metal values in a preferentially organic solvent-soluble or preferentially water-soluble oxidation state. However, the addition of oxidizing agents, such as $K_2Cr_2O_7$, and of reducing agents, such as ferrous sulfamate, involves somewhat tedious operations and tends to limit the extent to which the process solutions in which they are contained can be concentrated and thus requires handling of substantial volumes of material in subsequent steps. Moreover, some additives such as ferrous sulfamate are unstable.

We have discovered that the solubility of both zirconium values and tetravalent plutonium values in organic solvents is substantially reduced by incorporating a water-soluble substance containing oxalate anions in the uranium-containing aqueous solution; the zirconium as well as the plutonium is complexed by the oxalate, while the uranium is not appreciably affected thereby and thus retained in the preferentially solvent-soluble form. Consequently uranium can be decontaminated with respect to tetravalent plutonium and zirconium contained in an acidic aqueous solution by adding a water-soluble oxalate anion-containing substance thereto and then contacting the aqueous solution with a substantially water-immiscible liquid organic solvent.

Suitable oxalate ion-containing substances are oxalic acid, ammonium oxalate and the alkali metal oxalates such as potassium oxalate and sodium oxalate, or mixtures thereof. These oxalates are added to the aqueous solutions in such an amount to obtain a concentration of at least 0.0001 M, but preferably of about 0.01 M. Ammonium oxalate is the preferred complexing agent; it is stable under the usual process conditions and readily water-soluble.

The aforementioned concentrations of oxalate are effective when aqueous solutions containing uranium concentrations between 0.04 M and 0.4 M are used; concentrations of from 0.1 to 0.2 M uranium were found preferable.

The aqueous uranium-containing solution has to be acid; the preferred mineral acid is nitric acid in a concentration of from 2 to 7 M; however, the extraction and decontamination of uranium was optimum from solutions which were from 3 M to 5 M in nitric acid.

The organic solvents which are satisfactory for the extraction of uranium under the aforementioned conditions are substantially water-immiscible liquid organic solvents and particularly alkyl phosphates of the general formula

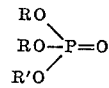

wherein R is a hydrogen atom or an alkyl radical and R' is an alkyl radical. In order to provide adequate immiscibility in water the total number of carbon atoms is preferably at least 12. Among the alkyl phosphates the trialkyl phosphates are the preferred solvents, and tributyl phosphate is especially well adapted to the foregoing separation process.

It is advantageous, in particular in the case of alkyl phosphates, to use a diluent together with the solvent in order to decrease viscosity and thus to facilitate phase separation. Suitable diluents for alkyl phosphate are methylcyclohexane and halogenated hydrocarbons such as carbon tetrachloride, which diluents have desirably high flash points, are non-corrosive to the containing vessel, have a reasonably low viscosity, good stability toward nitric acid and specific gravities lower than 0.8 or higher than 1.2 so that the solvent mixture has a substantially different density from the aqueous solution. The concentration of the organic solvent in the diluent is preferably 0.4 M or from about 15 to 30% by volume.

Partial saturation of the organic solvent phase with uranium increases decontamination of uranium. The volume flow ratio (organic/aqueous) for the extraction is suitably between 0.7 and 1.4 but volume flow ratios ranging from 1:5 to 5:1 are satisfactory.

The separation of the uranium from zirconium and/or plutonium values may either be carried out by selective extraction from the oxalate-containing aqueous solution, or else all of these values may first be coextracted and the plutonium and/or zirconium then be back-extracted with an oxalate-containing aqueous solution.

The oxalate complexes of zirconium and tetravalent plutonium may be decomposed and thus again be made extractable by the addition of a water-soluble aluminum salt, such as aluminum nitrate nonahydrate. The quantity of aluminum salt, of course, depends on the concentration of zirconium and/or plutonium; for most cases, though, a concentration of about 1 M in the solution to be treated has been found satisfactory.

Each embodiment is operable at temperatures between room temperature and 50° C. However, a temperature slightly above room temperature but substantially below boiling point of the solvent is preferred. A contact time of from 5 to 10 minutes usually suffices for the extraction.

Example I

An aqueous solution 0.1 M in uranyl nitrate and containing $3.4 \times 10^6$ cts./min./ml. zirconium was contacted with an equal volume of a solvent mixture, namely 0.4 M tributyl phosphate in methylcyclohexane. In two instances no complexing agent was used, while in the other two experiments oxalate was present. The results are shown in the table below.

| Complexing Agent | $HNO_3$ Conc. in Aqueous Solution M | Zr Beta Ratio (Org./Aq.) | Uranium Ratio (Org./Aq.) |
|---|---|---|---|
| None | 3 | $6.7 \times 10^{-3}$ | 4.1 |
| Do | 5 | $1.9 \times 10^{-2}$ | 4.7 |
| Oxalate, 0.01 M | 3 | $8.5 \times 10^{-5}$ | 3.5 |
| Do | 5 | $3.3 \times 10^{-4}$ | 4.5 |

These experiments show that the zirconium extraction was considerably reduced when oxalate was added, while the uranium extraction was only slightly affected.

Example II

Nearly all the beta and gamma activity normally extracted by an organic solvent is comprised of the fission products cerium, zirconium and ruthenium. The following data show that the extraction of gross beta, gross gamma and zirconium into the organic solvent phase is inhibited by the presence of potassium oxalate. The extraction tests were carried out from an aqueous solution formed of a neutron-irradiated uranium slug after cooling for 90 days; the nitric acid content was 3 N. Equal volumes of carbon tetrachloride 0.4 M in tributyl phosphate were used for the extraction.

| Equilibrium Uranium Concentration | | Complexing Agent in Aqueous Phase | Activity Ratios (organic/aqueous) | | | |
|---|---|---|---|---|---|---|
| in aqueous (M) | in solvent (M) | | Gross Beta $\times 10^4$ | Gross Gamma $\times 10^4$ | $Zr \times 10^4$ | U |
| 0.144 | 0.162 | None | 3.7 | 11.2 | 13.0 | 1.1 |
| 0.0687 | 0.132 | None | 6.2 | 18.2 | 25.0 | 1.9 |
| 0.0175 | 0.081 | None | 18.0 | 41.0 | 67.0 | 4.6 |
| 0.0065 | 0.048 | None | 30.0 | 60.0 | 103.0 | 7.4 |
| 0.160 | 0.144 | 0.01 M $K_2C_2O_4$ | 0.61 | 0.85 | 0.38 | 0.9 |
| 0.0632 | 0.133 | 0.01 M $K_2C_2O_4$ | 1.1 | 2.0 | 0.48 | 2.1 |
| 0.0166 | 0.083 | 0.01 M $K_2C_2O_4$ | 3.2 | 4.6 | 1.10 | 5.0 |
| 0.0068 | 0.045 | 0.01 M $K_2C_2O_4$ | 3.6 | 8.6 | 0.367 | 6.5 |

Example III

The following tests show that the plutonium extraction is also reduced by the addition of oxalate complexing agents. In the extraction equal volumes of carbon tetrachloride 0.4 M in tributyl phosphate and aqueous solution 3 M in nitric acid were contacted. The results are compiled in the following table. It will be readily seen that the uranium-plutonium separation is markedly improved by the use of an oxalate.

| Composition of Aqueous Feed | | | Equilibrium Uranium and Plutonium Concentrations | | | | |
|---|---|---|---|---|---|---|---|
| Uranyl Nitrate Hexahydrate (M) | Pu (c/m/ml) | Complexing Agent for Pu IV (M) | Organic Pu (c/m/ml) | Aqueous Pu (c/m/ml) | Organic UNH (M) | Aqueous UNH (M) | Plutonium Ratio (Org./Aq.) |
| 0.306 | $8.71 \times 10^4$ | None | $1.41 \times 10^4$ | $7.17 \times 10^4$ | 0.162 | 0.144 | 0.,97 |
| 0.188 | $5.5 \times 10^4$ | None | $8.9 \times 10^3$ | $4.48 \times 10^4$ | 0.132 | 0.0687 | 0.198 |
| 0.096 | $2.63 \times 10^4$ | None | $4.96 \times 10^3$ | $2.3 \times 10^4$ | 0.081 | 0.0175 | 0.216 |
| 0.0496 | $1.42 \times 10^4$ | None | $3.27 \times 10^3$ | $1.04 \times 10^4$ | 0.048 | 0.0065 | 0.314 |
| 0.306 | $8.71 \times 10^4$ | 0.01 $K_2C_2O_4$ | $5.36 \times 10^3$ | $8.4 \times 10^4$ | 0.144 | 0.144 | 0.064(?) |
| 0.188 | $5.5 \times 10^4$ | 0.01 $K_2C_2O_4$ | $1.95 \times 10^3$ | $5.1 \times 10^4$ | 0.133 | 0.063 | 0.038 |
| 0.096 | $2.65 \times 10^4$ | 0.01 $K_2C_2O_4$ | $1.26 \times 10^3$ | $2.7 \times 10^4$ | 0.083 | 0.0166 | 0.047 |
| 0.0496 | $1.42 \times 10^4$ | 0.01 $K_2C_2O_4$ | $6.8 \times 10^2$ | $1.34 \times 10^4$ | 0.045 | 0.0068 | 0.049 |

It will be understood that this invention is not to be limited to the details given herein but that it may be modified within the scope of the appended claims.

What is claimed is:

1. A process for the separation of uranium values from an aqueous solution containing uranyl values, at least 1 compound selected from the group consisting of plutonium (IV) compound and zirconium compound and nitric acid in a concentration between 2 M and 7 M, which comprises adding a water-soluble oxalate ion-containing substance to said solution whereby a complex soluble in said nitric acid solution is formed with said zirconium and said plutonium, contacting said nitric acid aqueous solution with a substantially water-immiscible, liquid, organic solvent containing an alkyl phosphate, separating a solvent extract phase containing uranium values from an aqueous raffinate containing the dissolved oxalate-complexed compounds.

2. The process of claim 1 wherein the substantially water-immiscible liquid organic solvent mixture contains an inert liquid hydrocarbon diluent for the alkyl phosphate.

3. The process of claim 2 wherein the alkyl phosphate is a trialkyl phosphate.

4. The process of claim 3 wherein the alkyl phosphate is tributyl phosphate.

5. The process of claim 1 wherein the oxalate ion-containing substance is ammonium oxalate.

6. The process of claim 1 wherein the oxalate ion-containing substance is added to the aqueous solution in an amount to effect therein an oxalate concentration of about 0.01 M.

7. The process of claim 1 wherein the nitric acid is present in a concentration of from 3 to 5 M.

8. A process for separating uranium values from an organic solution of uranyl values, zirconium values and tetravalent plutonium values in an alkyl phosphate-containing solvent, which comprises contacting said organic solution with an aqueous solution 2 M to 7 M in nitric acid and containing an oxalate ion-containing substance, separating an organic uranium-containing raffinate from an aqueous nitric acid extract phase, said aqueous nitric acid extract phase containing dissolved therein an oxalate complex of zirconium and an oxalate complex of plutonium.

9. A process for the separation of uranium values from a mixture of uranyl values and zirconium values contained an organic solvent containing tributyl phosphate, which comprises contacting said organic solvent with an aqueous solution 2 M to 7 M in nitric acid and containing a water-soluble oxalate compound, separating the organic solvent containing the uranium values from an aqueous nitric acid extract phase, said aqueous nitric acid extract phase containing dissolved therein an oxalate complex of zirconium.

10. A process for separating uranium values from an aqueous solution 2 M to 7 M in nitric acid and comprising uranyl values, zirconium values and tetravalent plutonium values, which comprises adding a water-soluble oxalate compound to said aqueous solution whereby an oxalate complex soluble in said nitric acid solution is formed with said zirconium and said plutonium, contacting the aqueous solution with a substantially water-immiscible liquid organic solvent containing trialkyl phosphate, separating an organic extract phase containing the uranium values from the aqueous solution containing the complexed zirconium and plutonium values, adding a water-soluble aluminum salt to said aqueous solution, adding a substantially water-immiscible liquid alkyl phosphate-containing solvent to said aqueous solution, and separating a plutonium and zirconium-containing alkyl phosphate phase from an aqueous raffinate.

11. A process for extracting zirconium from a nitric acid aqueous solution having dissolved therein an oxalate complex of zirconium with organic alkyl phosphate-containing solvent, which comprises adjusting the nitric acid concentration to between 2 M and 7 M adding a water-soluble aluminum salt to said solution, contacting said solution with the organic alkyl phosphate-containing solvent, and separating an organic zirconium-containing extract phase from an aqueous raffinate.

12. The process of claim 11 wherein the aluminum salt is aluminum nitrate.

13. A process of separating uranium values from zirconium values present in an aqueous solution 3 to 5 M in nitric acid, comprising adding alkali oxalate in a quantity to yield a concentration of about 0.01 M, contacting the solution with an equal volume of a diluent 0.4 in tributyl phosphate, and separating a solvent extract phase from an aqueous raffinate.

14. The process of claim 13 wherein the diluent is carbon tetrachloride.

15. The process of claim 13 wherein uranium is present in said aqueous nitric acid-containing solution in a concentration of about 0.1 M and the zirconium in a concentration of $3.4 \times 10^6$ cts./min./ml. and the diluent is methylcyclohexanone.

16. A process for the separation of uranium values from a nitric acid aqueous solution containing uranyl values, zirconium values and tetravalent plutonium values, which comprises contacting said solution with a substantially water-immiscible liquid organic solvent containing alkyl phosphate, separating an organic extract phase containing the uranium, zirconium and tetravalent plutonium values from an aqueous raffinate, contacting said organic extract phase with an aqueous solution 2 M to 7 M in nitric acid and also containing an oxalate ion-containing substance, and separating a uranium-containing organic raffinate from an aqueous zirconium- and plutonium-containing extract phase.

17. A process for the separation of uranium values from a nitric acid aqueous solution containing uranyl values and zirconium values, which comprises contacting said solution with a substantially water-immiscible liquid organic solvent containing alkyl phosphate, separating an organic extract phase containing said uranium and zirconium values from an aqueous raffinate, contacting said organic extract phase with an aqueous solution 2 M to 7 M in nitric acid and also containing an oxalate ion-containing substance, and separating a uranium-containing organic raffinate from an aqueous zirconium-containing extract phase.

18. A process for the separation of uranium values from a nitric acid aqueous solution containing uranyl values and tetravalent plutonium values, which comprises contacting said solution with a substantially water-immiscible liquid organic solvent containing alkyl phosphate, separating an organic extract phase containing said uranium and plutonium values from an aqueous raffinate, contacting said organic extract phase with an aqueous solution 2 M to 7 M in nitric acid and also containing and oxalate ion-containing substance, and separating a uranium-containing raffinate from an aqueous plutonium-containing extract phase.

19. A process for the separation of uranium values from a mixture comprising uranyl values and tetravalent plutonium values contained in an organic alkyl phosphate-containing solvent, which compriess contacting said organic solvent with an aqueous solution 2 M to 7 M in nitric acid and also containing an oxalate ion-containing substance, and separating a uranium-containing organic solvent phase from a plutonium-containing aqueous phase.

20. A process for extracting tetravalent oxalate-complexed plutonium from an aqueous solution containing nitric acid in a concentration from 2 M to 7 M with an organic alkyl phosphate-containing solvent, which comprises adding a water-soluble aluminum salt to said solution, contacting said solution with the organic alkyl phosphate-containing solvent, and separating an organic tetravalent plutonium-containing extract phase from an aqueous raffinate.

21. The process of claim 20 wherein the aluminum salt is aluminum nitrate.

References Cited in the file of this patent

UNITED STATES PATENTS

| | | |
|---|---|---|
| 2,227,833 | Hixson et al. | Jan. 7, 1941 |
| 2,316,141 | Wainer | Apr. 6, 1943 |

OTHER REFERENCES

Kohlschutter et al.: Berichte, vol. 34, pp. 1472–9 (1901). Copy in Scientific Library.

Rosenheim et al.: Berichte, vol. 40, pp. 806–7 (1907). Copy in Scientific Library.

Warf: U.S. Atomic Energy Commission Declassified Document AECD–2524, declass. March 11, 1949, 10 pages. Copy in Scientific Library.